Dec. 16, 1952 R. A. ROBERT 2,621,871
STEERING CONTROL DEVICE FOR JET-PROPELLED FLYING MACHINES
Filed July 8, 1948 6 Sheets-Sheet 1

INVENTOR
ROGER AIMÉ ROBERT
By:
Haseltine, Lake & Co.
AGENTS

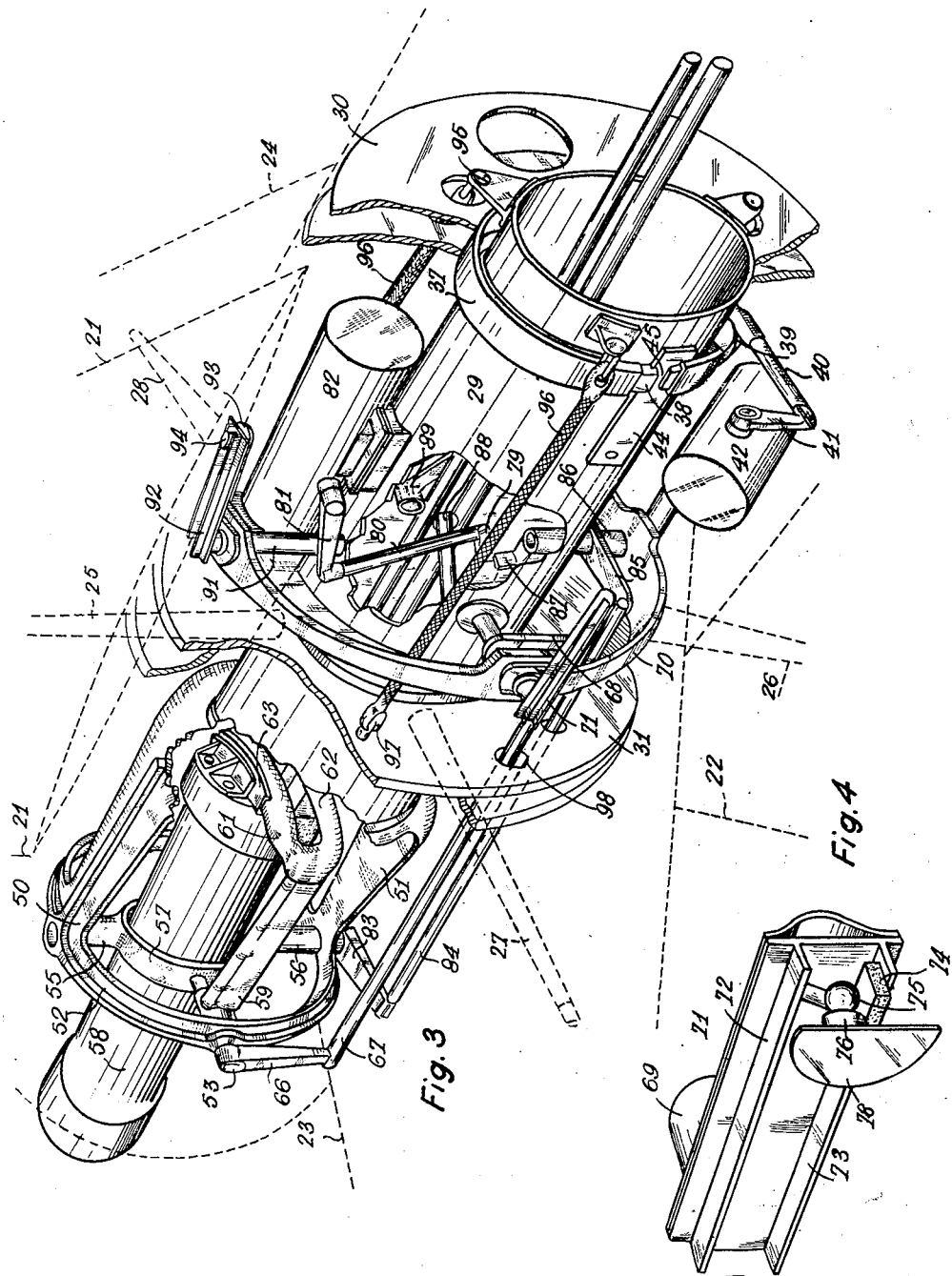

Dec. 16, 1952  R. A. ROBERT  2,621,871
STEERING CONTROL DEVICE FOR JET-PROPELLED FLYING MACHINES
Filed July 8, 1948  6 Sheets-Sheet 4

INVENTOR
ROGER AIME ROBERT
By:
Haseltine, Lake & Co.
AGENTS

Dec. 16, 1952  R. A. ROBERT  2,621,871
STEERING CONTROL DEVICE FOR JET-PROPELLED FLYING MACHINES
Filed July 8, 1948  6 Sheets-Sheet 5

INVENTOR
ROGER AIME ROBERT
By:
Hazeltine, Lake & Co.
AGENTS

Dec. 16, 1952 R. A. ROBERT 2,621,871
STEERING CONTROL DEVICE FOR JET-PROPELLED FLYING MACHINES
Filed July 8, 1948 6 Sheets-Sheet 6
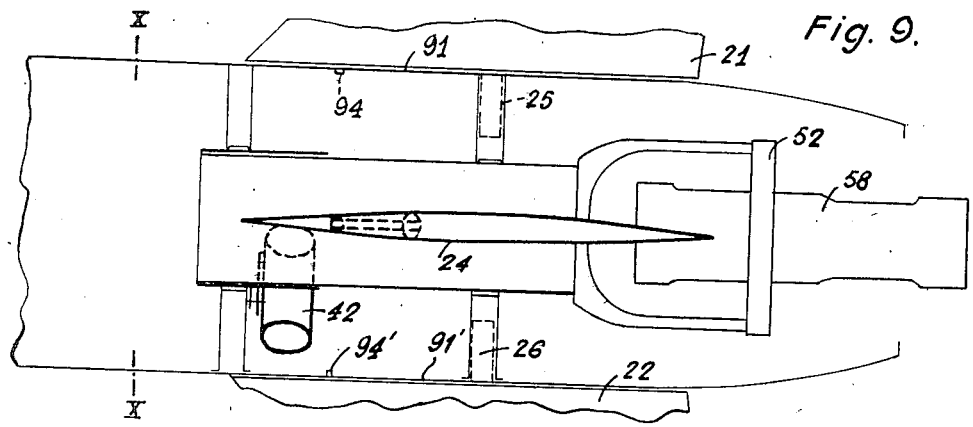
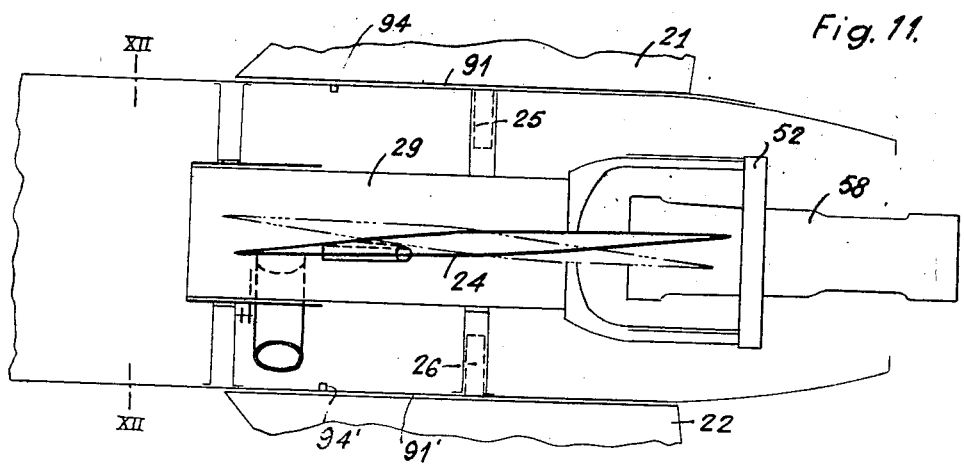
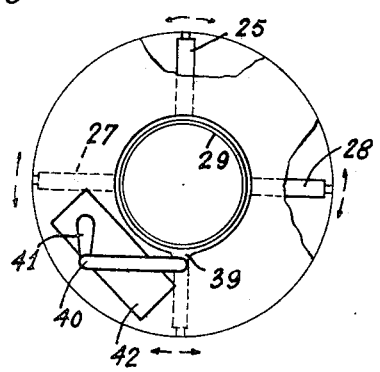
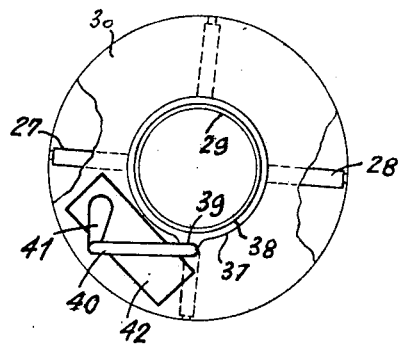
INVENTOR
ROGER AIME ROBERT
By:
Haseltine, Lake & Co.
AGENTS Patented Dec. 16, 1952

2,621,871

UNITED STATES PATENT OFFICE 2,621,871

STEERING CONTROL DEVICE FOR JET-PROPELLED FLYING MACHINES

Roger Aimé Robert, Boulogne-sur-Seine, France

Application July 8, 1948, Serial No. 37,640
In France July 30, 1947

8 Claims. (Cl. 244—52)

This invention relates to flying machines and missiles driven by jet propulsion, and more particularly to radio-controlled or guided missiles and machines of the above-defined type.

It is known that the efficiency of the direction-altering means in a flying machine are subject to variation with the speed of the flying machine. Such variations are especially great in the case of a flying machine capable of flying at subsonic, sonic and/or supersonic speeds.

It is accordingly an object of this invention to provide a system for controlling the line of flight of a flying machine of the type described so constructed and arranged that, the flying machine being equipped with two or a greater number of direction-altering means each particularly suitable for a predetermined range of flying speeds of said flying machine, said system will be adapted automatically to select and render operative the particular one of said means which corresponds to the speed of the machine.

The device is particularly applicable to a jet-driven flying machine whose propelling unit is ignited at the departure of the machine and imparts to the latter a progressively increasing speed increasing from zero up to a value which may be supersonic, and is then extinguished, the rocket proceeding on its course at high speed until it reaches its objective or target wherein the exhaust- or jet-nozzle is angularly adjustable or orientable and which further is provided with control surfaces.

It will then be characterized by the fact that, depending on the speed of the flying machine, it is controlled either through adjustment of the angular setting of the jet-nozzle or that of the control-surfaces or through both such means simultaneously.

According to another object of the invention moreover it is the jet-propulsion effect itself which is adapted to cause the selection of one or the other of said means, the thrust exerted by the exhaust jet being put to use for that purpose. It is exerted in full at the time the rocket is started or launched while the rocket's speed is still slow, and it diminishes as the speed of the rocket reaches a high value, thereafter dropping down to zero.

In one embodiment, the member carrying the jet-nozzle is mounted for sliding movement so as to be capable of assuming various positions in response to the thrust exerted by said jet, one end-position corresponding to control through the jet only and the opposite end-position corresponding to control through the control surfaces only.

Preferably the yaw and pitch controls only are subjected to such selective operation while the rolling control remains the same regardless of the flying speed of the machine.

According to a further important object or feature of the invention the pitch (or yaw) movements are (respectively) controlled from a common motor which, depending on the speed of the flying machine, is adapted to exert its action either through the medium of the jet-nozzle by altering the orientation or angular setting thereof, or through the medium of the control surfaces.

In one embodiment, the transmission from the control motor to the corresponding control surfaces is disabled as the thrust from the jet-nozzle exceeds a predetermined value and is made operative when said thrust is below said value, the amplitude of angular setting adjustment of the related control surface gradually becoming greater and greater in response to a given controlling action as the thrust from the jet-nozzle decreases.

It is another object of the invention to provide a control system including the above-defined features and wherein the assembly of means for the selective control of the flying machine through the jet-nozzle or through the control-surfaces is formed as a unit.

In the description which follows given by way of example only reference will be made to the accompanying drawings wherein:

Fig. 3 is a general view in perspective;

Fig. 4 is a view in perspective of a detail;

Fig. 9 is a diagrammatic plan view showing the rolling movement control means in the neutral position of the control surfaces;

Fig. 10 is a cross-section on the line 10—10 of Fig. 9;

Fig. 11 is a view similar to Fig. 9 but with the control surfaces set at an angle;

Fig. 12 is a cross-section on line 12—12 of Fig. 11.

Figure 1:
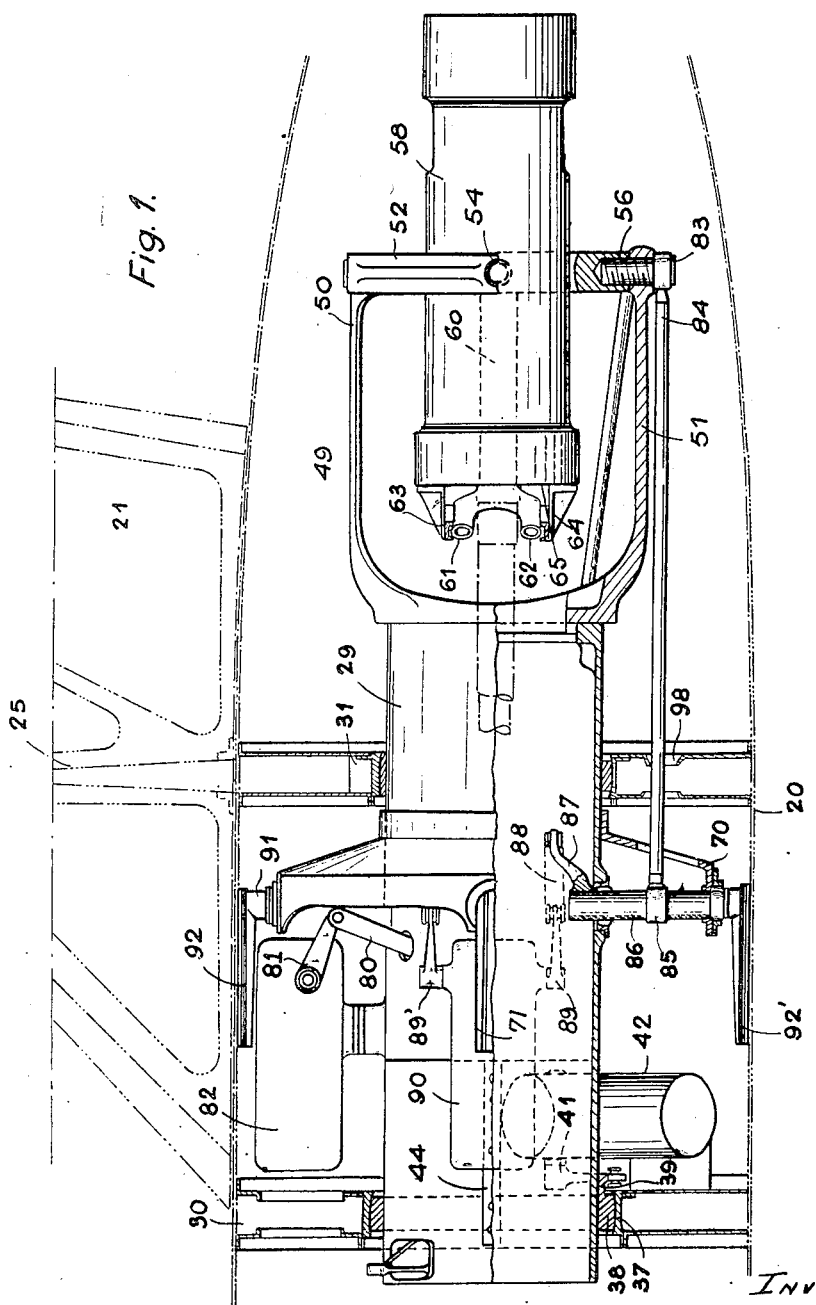
Fig. 1 is a view half in elevation and half in cross-section of a control device according to the invention.

The flying machine or missile shown comprises a fuselage 20 rearwardly supporting a tail-fin structure or empennage including two vertical empennage elements or fins 21 and 22 and two horizontal elements 23 and 24. Each of said elements is mounted for rotation on pivot shafts 25, 26, 27 and 28 respectively, extending radially away from the fuselage, thus forming the arms of a cross; the pivots 25—28 are arranged substantially at the center of the related elements of the empennage.

Within the fuselage 20 and coaxially therewith there is mounted a cylinder 29. The fuselage may for instance comprise framework members formed as circular ring-frames the end ones of which are shown at 30 and 31.

The frame 30 is formed with a circular central aperture 36 defined by an open ring member 37 having a U-shaped cross-section. The frame member 31 is formed with a similar circular aperture 32 defined by a ring 33.

In the ring member 37 there is supported an annulus 38 mounted for sliding movement within said ring. The annulus is formed with a projecting ear 39 with which is connected one end of a respective link 40 the opposite end of which is pivoted to the arm 41 which forms the output member of a control motor 42 secured to the fuselage 20.

It is within the annulus 38 that the cylinder 29 is mounted a sliding friction fit. Said cylinder has secured thereto on each side thereof a longitudinally-extending plate 44. The annulus 38 is formed with a pair of cut-outs to allow said plates to extend therethrough.

The cylinder 29 is supported in the frame member 31 through similar mounting means as those just described.

The rear portion of the cylinder 29 carries a nozzle-support 49 in the general form of a bell including an upper arm 50 and a lower arm 51, the ends of said arms being connected with an annular member 52 at two diametrically-opposed points thereof. Said annular member is formed with perforations angularly spaced 90° from each other and a first pair of which serve to receive a pair of horizontally-extending stub-shafts 53, 54 while the other pair of said apertures similarly receive a pair of vertically-extending stub-shafts 55, 56. The latter pair of stub-shafts are formed integrally with a ring 57 secured to the jet-nozzle 58 by means of opposite pivot pins 58' which are disposed in the plane of stub-shafts 53 and 54. As shown in Figure 1, a clearance is provided between the nozzle 58 and the ring 57 to permit rotation of the nozzle 58 about the axis established by the pivot pins 58'. The stub-shafts 53 and 54 are rigid with the arms 59 and 60 of a stirrup-member the cross-arm of which is formed by a pair of parallel arcuate rods 61 and 62 formed as portions of a circumference and which slidably engage plates 63 and 64 secured to the forward end-flange 65 of the nozzle 58.

The stub-shaft 53 has secured thereon a crank arm 66 with which is connected a link 67 the opposite end of which is connected with an arm 68 secured on a shaft 69. The shaft 69 is mounted for rotation in an annulus 70 concentric with and outwardly related to cylinder 29 in rigid connection therewith. The shaft 69 extends outwardly beyond the annulus 70. It carries on its outer end an arm 71 (see Figs. 3 and 4) adapted to function as a slideway, for which purpose it is formed with a pair of side flanges 72 and 73 along which a slide-block 74 is slidable. Said slide-block is formed with a spherical recess housing a swivel-member 75 formed with an extension shank or finger 76 terminating in a small plate 78 rigidly connected with the horizontal element 23 of the empennage.

The shaft 69 extends through the cylinder 29. The shaft 69 at the inner end thereof supports a crank-arm 79 which through a link 80 is connected with an arm 81 forming the output member of a motor 82 supported by cylinder 29 used for controlling the pitching movements of the flying machine. A similar kinematic system, illustrated in Figures 5 to 8 and wherein corresponding elements bear the same reference numerals with exponential "'," is positioned symmetrically with respect to the vertical plane of symmetry, for the purpose of controlling the other horizontal element 24.

The stub-shaft 56 (see Fig. 1) has secured thereon a crank-arm 83 with which is connected a link 84 the other end of which is connected with a crank-arm 85 secured on a shaft 86. The shaft 86 is adapted to be actuated through an arm 87 and a link 88 (see Fig. 1) connected with the output member 89 of a motor 90 supported by cylinder 29 controlling the yaw movements of the machine.

Figure 2:
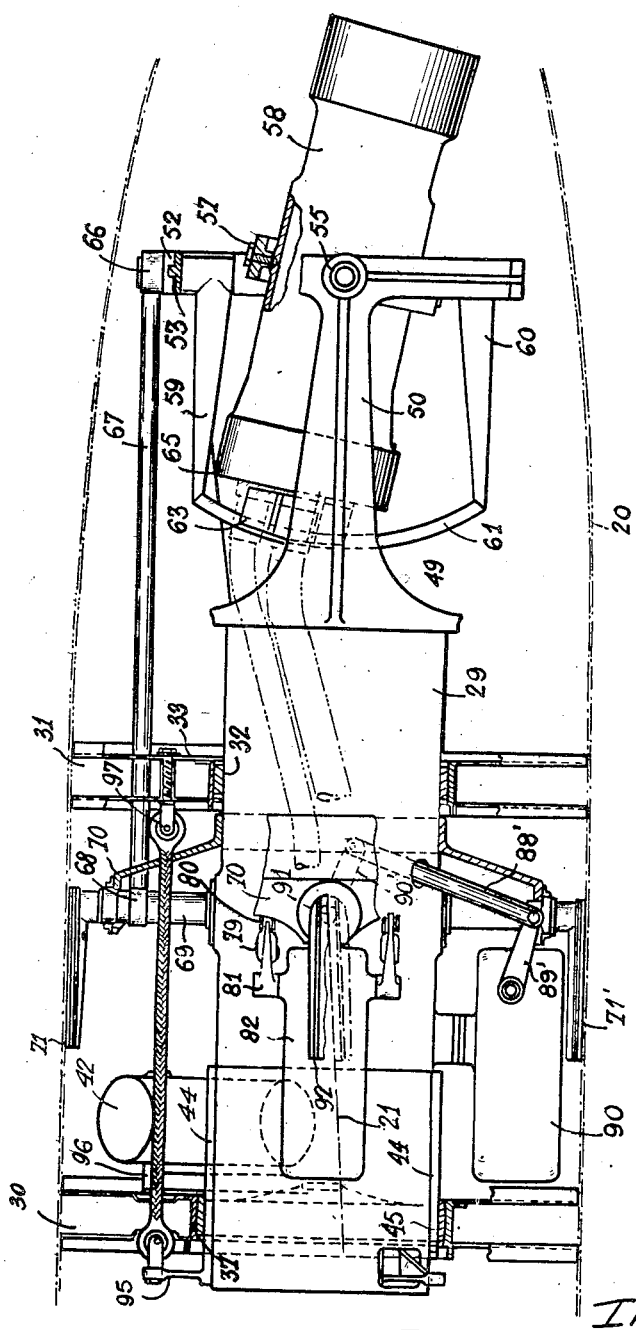
Fig. 2 is a corresponding view half in plan and half in cross-section on a plane displaced 90° from that of the preceding figure.

Said motor is adapted further to actuate through the crank-arm 89' (see Figure 2) and the link 88' and crank-arm 90' a shaft 91 (see Figure 3) carried by the cylinder 29 and extending through the annular member 70. The shaft 91 supports on the end thereof an arm 92 similar to the arm 71 in that it has slidably mounted thereon a block 93 carrying a projecting finger terminating in a plate 94 rigidly connected with the vertical empennage element or tail-fin 21.

The empennage element 24 is connected with the control motor 82 in a manner similar to that described for the element 23. The empennage element 22 is connected with the motor 90 in a manner similar to that described for the empennage element 21.

On the front portion of the cylinder 29 there are secured ears or lugs 95 with which are connected resilient return means such as elastic cords 96 the free ends of which are secured as at 97 to the rearmost ring-frame member 31.

Apertures 98 are formed in the ring-frame members 30 and 31 to allow said elastic cords as well as suitable coupling members such as links to extend therethrough.

Figure 6:
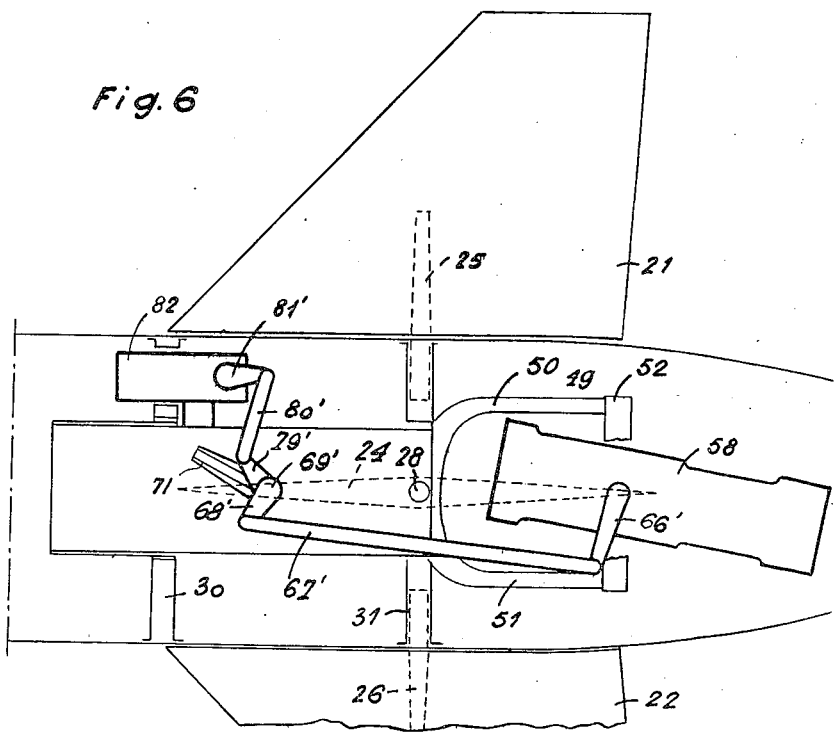
Fig. 6 is a view similar to Fig. 5 but wherein the axis of the jet-nozzle is shown as angularly displaced from that of the machine.
Figure 5:
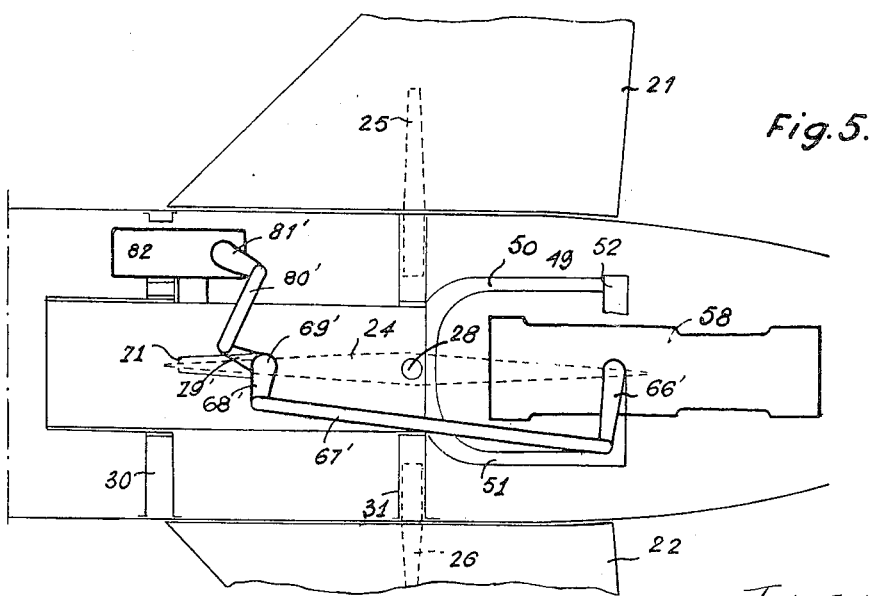
Fig. 5 is a diagrammatic view in elevation of the device for controlling the flying machine through the angular orientation of the jet-nozzle, the center axis of the latter being shown as coinciding with the longitudinal axis of the flying machine.

The above-described control device operates as follows:

With the jet-propulsion means in operation a thrust is thereby exerted which brings the cylinder 29 and the elements supported thereby to a "forward" position against the action of the elastic cords 96 (Figs. 5 and 6). In this position, the shafts 69—69' and the corresponding fingers 76—76' are in alignment with each other. The same is true of the shafts 91—91' and the fingers relating thereto. Under such conditions, upon one of the pitch- or yaw-control motors, say motor 82, being started, it will modify the orientation of the jet-nozzle 58 through the intermediacy of the mechanical connecting means interposed between said nozzle and said motor. Such actuation however will not result in angularly setting the empennage elements, since the finger 76 for instance being in alignment with the shaft 69, the length of the lever-arm interposed between said shaft and said finger is equal to zero. Rotation of the shaft 69 will then simply result in rotating the swivel-member 75 within the slide block 74. Moreover, the corresponding empennage elements, e. g. the elements 23 and 24, remain locked in normal or non-set position as concerns any movements which they might assume under the effect of external forces.

Thus the control of the flying machine when the jet-drive means exerts a sufficiently high thrust, is effected, so far as the yaw and pitch motions are concerned, exclusively through variations in orientation of the jet-nozzle 58. Such control is particularly efficient at relatively low speeds at which the control through angular positioning of the empennage or tail-fin elements is on the other hand less efficient. In the case of a flying-machine of the rocket type, it thus is possible to control it immediately from the start, at a time when it has not yet attained a high speed.

Figure 8:
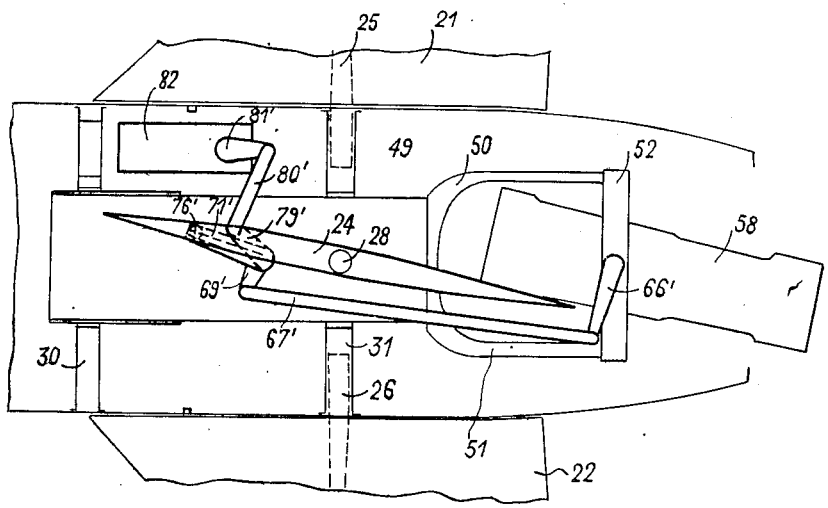
Fig. 8 is a view similar to Fig. 7 but wherein the middle plane of said control surface is angularly displaced from said longitudinal axis.
Figure 7:
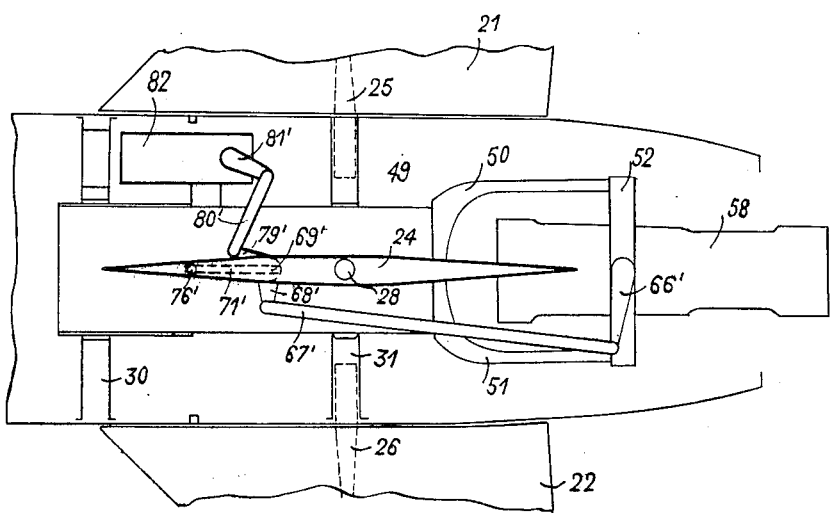
Fig. 7 is a view similar to Fig. 5 but wherein the parts of the device are shown as occupying the position wherein the control of the machine is exerted through the control surfaces, the intermediate plane of the control surface shown in the figure extending through the longitudinal axis of the machine.

After the jet-propulsion means has stopped operating or its thrust has dropped below a predetermined value, the action of the elastic-cords 96 becomes predominant and the cylinder 29 is brought to its "rearward" position (see Figs. 7 and 8). During this movement, the arms 71—71' and 92—92' supported by the cylinder 29 assume a relative sliding movement with respect to their related slide-block such as 74. The finger 76 and the related pivot shaft 69 for instance, are then no longer in alignment with each other. Under such conditions, upon a control motor being started, say the motor 82, rotation of the shaft 69 causes the finger 76 to follow an arcuate path of movement centered on said shaft, thereby imparting an angular setting to the empennage elements such as 23 and 24 about their pivots 27 and 28. In the case of empennage element 24 for instance, said element will thus be shifted from dead center position as in Fig. 7 to the fully set position of Fig. 8.

For a similar amplitude of actuation of the control motor 82, said setting will moreover depend on the length of the lever arm introduced between the shaft 69 and finger 76. Said setting will therefore be a maximum when the jet-propulsion means has completely ceased its operation. It will on the other hand be of lesser amplitude when the jet-drive, without having entirely stopped operating, no more exerts sufficient action to fully oppose the pull of the elastic cords 96. In that case, the variation in orientation of the nozzle 58 still in operation, will participate in applying the desired directional and altitude control effects.

The control of rolling movements is effected from the motor 42, regardless of whether the jet-nozzle is or is not operating. Starting of said motor will through the link 40 cause a rotation of the cylinder 29 about its axis (Figs. 9 to 12). This rotation causes the four empennage elements or fins 21—24 to be simultaneously angularly rotated together and in a common direction (Figs. 11 and 12), this movement being made possible by virtue of the swivel mounting of the fingers such as 76 in the related slide-blocks 73. Irrespective of whether the cylinder 29 is in its "forward" or "rearward" position, the action of the link 40 in one or the other direction as the case may be, upon the annulus 38 brings about a rotation of said cylinder, because of the cooperation of the cut-outs 45 of the annulus 38 with the plates 44—44' secured to the cylinder. During such rotation the annulus such as 38 will slide within the ring 37 rigid with the ring-frame 30 (or 31).

I claim:

1. In an aircraft having a fuselage, movable flight control surfaces and a reaction engine producing a variable thrust; means mounting said engine for forward movement along the longitudinal axis of said aircraft in response to the thrust of said engine, means yieldingly opposing said forward movement with a predetermined force whereby said engine will be disposed at its forward position only when said thrust is at least equal to said predetermined force, means for controlling the position of said surfaces to control the direction of flight of the aircraft, and means interconnecting said control means and said engine and operative in response to forward movement of said engine with respect to said fuselage to reduce the effectiveness of said control means and to render said control means inoperative when said engine has reached said forward position.

2. In an aircraft having a fuselage, movable control surfaces, and a tiltable reaction engine producing a variable thrust; means in said fuselage slidably supporting said engine for bodily longitudinal movement between a first position and a second position, the thrust of said engine being effective to urge said engine toward said second position, resilient means extending between said engine and said fuselage effective to urge said engine toward said first position, power means, first means actuated by said power means for tilting said nozzle, second means actuated by said power means for moving said control surfaces, and means interconnecting said second means and said engine and operative in response to movement of said engine toward said second position to reduce the effectiveness of said second means and to render said second means inoperative when said engine has reached said second position.

3. In a jet propelled flying machine having a fuselage; a jet nozzle, means in said fuselage slidably mounting said nozzle for movement parallel with the longitudinal axis of said fuselage, resilient means urging said nozzle with a predetermined force in a direction opposite to that in which it is urged by the thrust from said nozzle, flight control surfaces movably mounted on said fuselage, means including a lever for controlling the setting of said flight control surfaces, and means interconnecting said nozzle and said lever for rendering said lever operative when said predetermined force exceeds the thrust from said nozzle and for rendering the same inoperative when said thrust exceeds said predetermined force.

4. In a jet propelled flying machine having a fuselage; a jet nozzle within and normally substantially coaxial with said fuselage, structure for supporting said jet nozzle for movement about a plurality of transverse axes, means for supporting said structure on said fuselage for forward movement in a direction parallel with the axis of said fuselage when said nozzle exerts a thrust, resilient means between said fuselage and said structure exerting a predetermined resistance against said forward movement, power means mounted on said structure, transmission means operably connecting said power means to said nozzle to control the movement thereof about said axes, control surfaces pivotally mounted on said fuselage, second transmission means operably connecting said power means to said control surfaces including a lever, and means connected to said engine and movable therewith for varying the effective length of said lever from a zero value when said structure occupies its forward position when the thrust of said nozzle exceeds said predetermined resistance up to a maximum value when said structure occupies its rearward position when said predetermined resistance exceeds said thrust.

5. An aircraft comprising a fuselage; a support mounted therein and slidable in a fore-and-aft direction with respect thereto; a rearwardly directed jet nozzle; means connecting said nozzle to said support and arranged to provided tilting of said nozzle; resilient means connected to said support and said fuselage arranged to urge said support rearwardly with respect to said fuselage against the thrust of said nozzle; control surface means on pivoted said fuselage about a transverse axis, power means carried by said support and connected to said nozzle for tilting said nozzle, said control surface means having a crank element secured thereto and offset from said transverse axis, said power means including a transversely disposed shaft aligned with said crank element when said support is in its foremost position; and a crank arm mounted on said shaft and slidably engaging said crank element, whereby said power means will be inoperative to actuate said control surface means when said support is in its foremost position and operative to actuate said control surface means when said support is displaced rearwardly from its foremost position and operative to tilt said nozzle at all fore-and-aft positions of said support.

6. An aircraft comprising a fuselage; a support mounted therein and slidable in a fore-and-aft direction with respect thereto; a rearwardly directed jet nozzle; means connecting said nozzle to said support and arranged to provide tilting of said nozzle; resilient means connected to said support and said fuselage arranged to urge said support rearwardly with respect to said fuselage against the thrust of said nozzle; first and second control surface means pivoted on said fuselage about a vertical and a transverse horizontal axis, respectively; first and second power means carried by said support and connected to said nozzle for tilting said nozzle in a vertical and in a horizontal plane, respectively, each of said first and second control surface means having a crank element secured thereto and offset, respectively, from said vertical and horizontal axes, each of said first and second power means including a transversely disposed shaft aligned with a respective one of said elements when said support is in its foremost position; and a crank arm mounted on each of said shafts and slidably engaging a respective one of said crank elements, whereby said power means will be inoperative to actuate said control surface means when said support is in its foremost position and operative to actuate said control surface means when said support is displaced rearwardly from its foremost position and operative to tilt said nozzle in all fore-and-aft positions of said support.

7. An aircraft comprising a fuselage; a support mounted therein and slidable in a fore-and-aft direction with respect thereto; a rearwardly directed jet nozzle, means connecting said nozzle to said support and arranged to provide tilting of said nozzle; resilient means connected to said support and said fuselage arranged to urge said support rearwardly with respect to said fuselage against the thrust of said nozzle; control surface means pivoted on said fuselage about a transverse axis; power means carried by said support and connected to said nozzle for tilting said nozzle, said control surface means having a crank element secured thereto and offset from said transverse axis, said power means including a transversely disposed shaft aligned with said crank element when said support is in its foremost position; a crank arm mounted on said shaft and slidably engaging said crank element; and motor means connected to said support for rotating said support about a fore-and-aft axis, whereby said power means will be inoperative to actuate said control surface means when said support is in its foremost position and operative to actuate said control surface means when said support is displaced rearwardly from its foremost position and operative to tilt said nozzle at all fore-and-aft positions of said support, and whereby said motor means will be operative to actuate said control surfaces of all fore-and-aft positions of said support.

8. An aircraft comprising a fuselage; a support mounted therein and slidable in a fore-and-aft direction with respect thereto; a rearwardly directed jet nozzle; means connecting said nozzle to said support and arranged to provide tilting of said nozzle; resilient means connected to said support and said fuselage arranged to urge said support rearwardly with respect to said fuselage against the thrust of said nozzle; first and second control surface means pivoted on said fuselage and a vertical and a transverse horizontal axis, respectively; first and second power means carried by said support and connected to said nozzle for tilting said nozzle in a vertical and in a horizontal plane, respectively, each of said first and second control surface means having a crank element secured thereto and offset, respectively, from said vertical and horizontal axes, each of said first and second power means including a transversely disposed shaft aligned with a respective one of said elements when said support is in its foremost position; a crank arm mounted on each of said shafts and slidably engaging a respective one of said crank elements, and motor means connected to said support for rotating said support about a fore-and-aft axis, whereby said power means will be inoperative to actuate said control surface means when said support is in its foremost position and operative to actuate said control surface means when said support is displaced rearwardly from its foremost position and operative to tilt said nozzle at all fore-and-aft positions of the support, and whereby said motor means will be operative to actuate said control surfaces at all fore-and-aft positions of the support.

ROGER AIMÉ ROBERT.

REFERENCES CITED

The following references are of record in the file of this patent:

UNITED STATES PATENTS

| Number | Name | Date |
| --- | --- | --- |
| 1,385,257 | McLean | July 19, 1921 |
| 2,086,545 | Fator | July 13, 1937 |
| 2,397,658 | Goddard | Apr. 2, 1946 |
| 2,472,839 | Kramer | June 14, 1949 |

FOREIGN PATENTS

| Number | Country | Date |
| --- | --- | --- |
| 579,968 | Great Britain | Aug. 22, 1946 |